UNITED STATES PATENT OFFICE 2,545,439

PREPARATION OF NUCLEAR SUBSTITUTED CINNAMYL ALCOHOLS

Charles F. H. Allen and John R. Byers, Jr., Rochester, N. Y., assignors to Eastman Kodak Company, Rochester, N. Y., a corporation of New Jersey No Drawing. Application January 17, 1948, Serial No. 2,968

6 Claims. (Cl. 260—613)

This invention relates to the preparation of nuclear-substituted cinnamyl alcohols, and esters thereof, by the selective reduction of a nuclear-substituted cinnamic acid ester. More specifically, this invention provides a process for preparing nuclear-substituted cinnamyl alcohols, e. g. coniferyl alcohol, which have not been prepared synthetically and are available only in limited quantities, since they are derived from natural sources with great difficulty.

Thus, coniferyl alcohol occurs in nature as the glucoside, coniferin, which can be obtained from the cambial juice of conifers. Tiemann and Haarmann, "Berichte," vol. 7 (1871), page 608. Tiemann and Haarmann prepared coniferyl alcohol by fermentation of the cambial juice, which they obtained from conifers, using the enzyme, emulsin, as the active splitting agent. Later it was suggested that the coniferyl alcohol may occur as the benzoate. Perf. and Ess. Oil Rec., 34 (1943), page 341.

We have now found that nuclear-substituted cinnamyl alcohols, e. g. coniferyl alcohol, can be prepared synthetically using easily accessible materials.

It is, accordingly, an object of our invention to provide a process for preparing nuclear-substituted cinnamyl alcohols. A further object of our invention is to provide a process for preparing esters of nuclear-substituted cinnamyl alcohols. A still further object of our invention is to provide a process for selectively reducing organic carbonyl compounds containing olefinic unsaturation. Other objects will become apparent from a consideration of the following description.

According to the process of our invention, we selectively reduce a nuclear-substituted cinnamic acid ester to the corresponding nuclear-substituted cinnamyl alcohol by reacting the nuclear-substituted cinnamic acid ester with lithium aluminum hydride, a reducing agent whose formula can be illustrated as:

LiAlH4

According to the process of our invention we can then prepare an ester of the nuclear-substituted cinnamyl alcohol without isolating the alcohol from the reaction mixture resulting from the selective reduction.

It is known that lithium aluminum hydride reduces cinnamic acid to hydrocinnamyl alcohol (Nystrom and Brown, "J. A. C. S.," vol. 69 (1947), page 2549), however, quite unexpectedly, we have now found that when nuclear-substituted cinnamic acid esters are reduced with this new reagent, the carbonyl group is preferentially reduced, and the carbon-to-carbon double bond in the side-chain is not attacked. While Nystrom and Brown have taught that it is characteristic of lithium aluminum hydride, that compounds containing olefinic groups, substituted on one end by a phenyl nucleus and on the other by a reducible group, are reduced not only at this reducible group but also at the olefinic bond, we have found that esters of nuclear-substituted cinnamic acids do not follow this expected trend, but are reduced to the corresponding nuclear-substituted cinnamyl alcohols instead.

The nuclear-substituted cinnamic acid esters which we can advantageously employ in practicing our invention can be represented by the following two formulas:

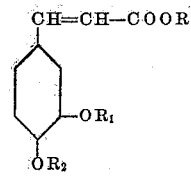

and

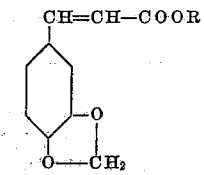

wherein R represents an alkyl group, such as methyl, ethyl, propyl, isopropyl, n-butyl, isobutyl, etc. (e. g. an alkyl group having the formula $C_nH_{2n+1}$ wherein $n$ is a positive integer from 1 to 4), and $R_1$ and $R_2$ each represents a member selected from the group consisting of a methyl group, an ethyl group, and an acetyl group. Typical esters include methyl acetyl ferulate, ethyl acetyl ferulate, n-butyl acetyl ferulate, methyl 3,4-dimethoxycinnamate, ethyl 3,4- dimethoxycinnamate, methyl 3,4-diacetoxycinnamate, methyl 3,4 - methylenedioxycinnamate, ethyl 3,4-methylenedioxycinnamate, etc.

When lithium aluminum hydride reduces the nuclear-substituted cinnamic acid esters in accordance with the process of our invention, the reaction can be illustrated as follows:

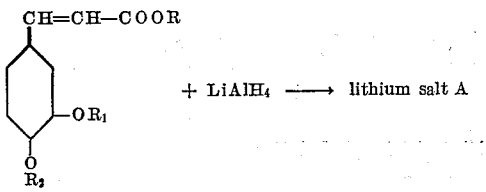

wherein R, $R_1$, and $R_2$ have the definitions set forth above. The exact structure of these lithium salts has not been determined, however, present evidence indicates that a complex alcoholate of lithium and aluminum is formed. These lithium salts can then be used directly in the preparation of other organic compounds (e. g. carboxylic acid esters), or the nuclear-substituted cinnamyl alcohols can be obtained by treating lithium salt A with an aqueous solution of boric acid, di-sodium phosphate, ammonium chloride, ammonium sulphate, etc. Alternatively, the nuclear-substituted cinnamyl alcohol can be obtained by treating lithium salt A with water to give precipitate of a complex alcoholate of lithium, which can be designated lithium salt B. When an aqueous suspension of this lithium salt B is treated with a weak, inorganic, gaseous anhydride (e. g. carbon dioxide), the nuclear-substituted cinnamyl alcohol is obtained.

It has been found further that when this lithium salt B is treated with the anhydride of an organic carboxylic acid, an ester of the nuclear-substituted cinnamyl alcohol is formed. Organic carboxylic acid anhydrides which can be used in practicing our invention can be represented by the formula:

$$(R_3-CO)_2O$$

wherein $R_3$ represents a member selected from the group consisting of an alkyl group, such as methyl, ethyl, n-propyl, isopropyl, etc. (e. g. an alkyl group having the formula $C_nH_{2n+1}$ wherein n is a positive integer from 1 to 3), an aryl group, such as a phenyl ($C_6H_5$) group, etc., and an aralkyl group, such as a phenylmethyl ($C_6H_5CH_2-$) group, etc. Typical carboxylic acid anhydrides include: acetic anhydride, propionic anhydride, n-butyric anhydride, isobutyric anhydride, benzoic anhydride, phenylacetic anhydride, etc.

THE CATALYST

Example I

The catalyst was prepared according to the method of Finholt, Bond, and Schlesinger, Jour. Am. Chem. Soc., vol. 69 (1947), page 1200.

60 gms. (7.5 moles) of lithium hydride of rather large particle size were placed in the jar of a pebble mill under an atmosphere of dry, carbon dioxide-free nitrogen, and ground for 18 hours. At the end of this time the lithium hydride had been ground uniformly to less than 100-mesh particle size. While working under an atmosphere of nitrogen, the pebbles of finely ground lithium hydride were poured onto a screen over a 3 liter beaker. The lithium hydride was washed into the beaker by means of 100 ml. of anhydrous ether. The contents of the beaker were washed with another 100 ml. of anhydrous ether into a 2 liter three-necked flask equipped with stirrer, coil condenser, and dropping funnel, all of which had been swept free of air with nitrogen. Twenty (20) ml. of lithium aluminum hydride solution containing 0.85 gm. (0.025 mole) of lithium aluminum hydride obtained from a previous preparation were added to the lithium hydride slurry and the mixture stirred for 30 minutes. (This lithium aluminum hydride solution lowered the induction time for the reaction and prevented a too violent release of energy.) A solution of 200 gms. (1.5 moles) of aluminum chloride in 1 liter of anhydrous ether was prepared by dissolving the aluminum chloride in the ether while the temperature of the contents of the vessel was maintained at 10° C. This solution was then added to the contents of the three-necked flask at such a rate as to maintain a good reflux of the ether. The time required for the addition was approximately 4 hours. After all the aluminum chloride solution had been added, and the reaction had been completed, the lithium chloride formed and the unreacted lithium hydride were removed by suction on a funnel. The solid was then washed once with 200 ml. of anhydrous ether, and the solution containing the lithium aluminum hydride placed in a stoppered flask in a refrigerator so that aliquots could be taken from time to time for running reduction reactions. The solid remaining behind on the suction funnel was deactivated by adding it portionwise to ethanol. The overall reaction which took place can be illustrated by the equation:

$$4LiH + AlCl_3 \xrightarrow{\text{ether}} LiAlH_4 + 3LiCl$$

Although we generally prepare our nuclear-substituted cinnamyl alcohols from known esters of nuclear-substituted cinnamic acids, in the preparation of coniferyl alcohol, the esters which we employ have not been previously described in the literature and the following examples illustrate the preparation of typical compounds which we can use.

Example II.—3-methoxy-4-acetoxycinnamic acid (4-acetylferulic acid)

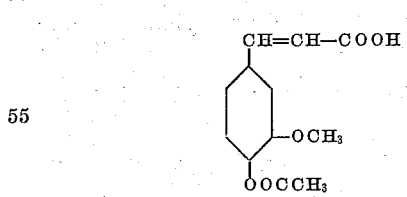

100 gms. (0.66 mole) of vanillin and 100 gms. (1.25 moles) of freshly fused sodium acetate were ground together in a mortar until well mixed. The fine powder was transferred to a 2 liter flask, and 500 gms. (5 moles) of acetic anhydride and 1 gm. of pyridine were added. The mixture was then refluxed on an oil bath at 160–170° C. for 8 to 10 hours. While still hot, the solution was poured onto 1500 gms. of crushed ice. By stirring and heating, the brown oil formed was redissolved and the solution allowed to stand overnight in a refrigerator. The yellow solid, 3-methoxy-4-acetoxycinnamic acid, which separated out was filtered and washed first with water and then with alcohol. A yield of 64% of crude acid was obtained. After several crystallizations from 50% acetic acid, a 51% yield of pure product, melting at 194–196° C. was obtained.

*Example III.—3 - methoxy-4-acetoxycinnamoyl-chloride (4-acetylferulic acid chloride)*

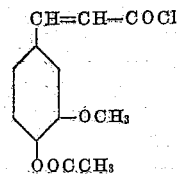

51 gms. (0.24 mole) of 3-methoxy-4-acetoxycinnamic acid were refluxed for 30 minutes in 43 gms. (0.36 mole) of thionyl chloride. The excess thionyl chloride was then removed under a vacuum, and 100 ml. of benzene were added and then distilled at low pressure. After repetition of this benzene distillation, the residual thionyl chloride was almost completely removed. The solid residue was then dissolved in a minimum amount of benzene, and after treatment with decolorizing carbon, the solid was recrystallized. The yield of yellow 3-methoxy-4-acetoxycinnamoyl chloride, melting at 133–134° C., was 82%.

*Example IV.—Ethyl 3-methoxy-4-acetoxycinnamate (ethyl 4-acetylferulate)*

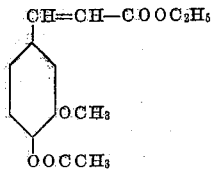

50 gms. (0.20 mole) of 3-methoxy-4-acetoxycinnamoyl chloride were refluxed for 2 hours with absolute ethanol. At the end of this time, the reaction mixture was distilled, and 44 gms. of ethyl 3-methoxy-4-acetoxycinnamate, having a boiling range of 186–189° C./5 mm. and a melting point of 42–44° C. were obtained. This represents a yield of 70%.

Operating in a similar manner other esters of 3-methoxy-4-acetoxycinnamic acid can be prepared. For example, by substituting molecularly equivalent amounts of methyl, propyl, isopropyl, n-butyl, or isobutyl alcohols in the above example, other esters can be obtained. Likewise, by substituting other substituted aromatic aldehydes for vanillin in Example II, other nuclear-substituted cinnamic acids can be obtained, from which esters can be prepared in the manner illustrated above. Useful aldehydes include ethyl vanillin:

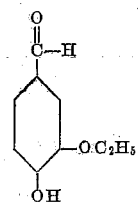

isovanillin:

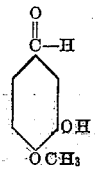

protocatechuic aldehyde:

veratric aldehyde:

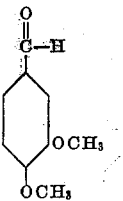

piperonal:

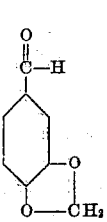

etc.

The following example will illustrate the manner in which we reduce one of these esters of a nuclear, substituted cinnamic acid with lithium aluminum hydride.

*Example V.—Coniferyl alcohol (3-methoxy-4-hydroxy-cinnamyl alcohol)*

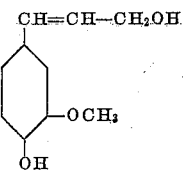

A solution of 8 parts of ethyl 3-methoxy-4-acetoxycinnamate in 50 parts of anhydrous ethyl ether was placed in a dry apparatus, protected from moisture, and which had been flushed with dry, carbon dioxide-free nitrogen. A molecular equivalent of the ethereal solution of lithium aluminum hydride prepared in Example I was added, dropwise, with stirring. A very vigorous reaction took place, and a yellow precipitate formed from the boiling ether. Upon standing for a few minutes the yellow precipitate became white. After the addition of the lithium aluminum hydride was complete, and the reaction had subsided, a solution of 10.5 parts of ammonium sulfate in 20 parts of water was admitted over a half hour period. The solid precipitate became pasty and tan-colored.

The ether layer was separated and the solid triturated with 50 parts of ether. The solvent was distilled from the combined ethereal solutions, leaving 6.5 parts of a straw-colored oil. This residue was distilled in vacuo, and 5 parts of coniferyl alcohol boiling at 163–165° C./3 mm. was obtained. This represented a yield of 73.7%. Although coniferyl alcohol proved difficult to crystallize, crystals were obtained from ether having a melting point of 72–73° C., whereas the literature reports a melting point of 73–74° C.

| Analysis | Calculated | Found |
|---|---|---|
| C | 66.6 | 66.0 |
| H | 6.66 | 6.5 |

By substituting molecularly equivalent amounts of other nuclear-substituted cinnamic acid esters in the above example, still other nuclear-substituted cinnamyl alcohols can be prepared. For example, when a molecularly equivalent amount of methyl 3,4-dimethoxycinnamate is substituted for the ethyl 3-methoxy-4-acetoxycinnamate, 3,4-dimethoxycinnamyl alcohol represented by the formula:

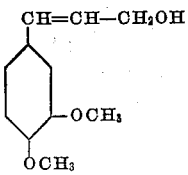

can be obtained. Similarly, when a molecularly equivalent amount of methyl 3,4-diacetoxycinnamate replaces the ethyl 3-methoxy-4-acetoxycinnamate of the above example, 3,4-dihydroxycinnamyl alcohol represented by the formula:

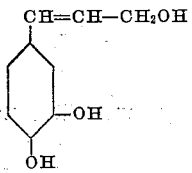

can be obtained. In a like manner when ethyl 3,4-methylenedioxycinnamate replaces the ethyl 3-methoxy-4-acetoxycinnamate of Example V, 3,4-methylenedioxycinnamyl alcohol having the formula:

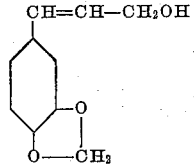

can be obtained.

When isovanillin is reacted with sodium acetate and acetic anhydride according to the process of Example II, and the acid obtained thereby is esterified with ethyl alcohol according to the method set forth in Examples III and IV, followed by reduction of the ester according to the method of Example V, 3-hydroxy-4-methoxycinnamyl alcohol having the formula:

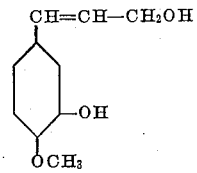

can be obtained. Operating in a similar manner, 3-ethoxy-4-hydroxy cinnamyl alcohol having the formula:

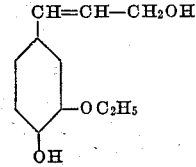

can be obtained from ethyl vanillin (3-ethoxy-4-hydroxybenzaldehyde).

As described above, when the lithium salt A is treated with water alone, a second and different salt which can be designated as lithium salt B is formed. When this lithium salt B is reacted with a carboxylic acid anhydride, an ester of the nuclear-substituted alcohol, derived by the reduction of its corresponding nuclear-substituted cinnamic acid ester, is obtained. The following example illustrates this variation of the process of our invention.

*Example VI.—Coniferyl benzoate*

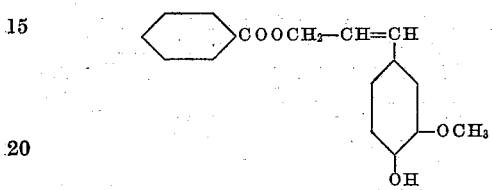

The yellow precipitate of lithium salt A obtained as described in Example V by the reduction of ethyl 4-acetoxy-3-methoxycinnamate with lithium aluminum hydride was decomposed by the addition of 20 parts of water alone. The solid became canary yellow upon addition of the water. It was filtered off, rinsed with dry ethanol, and then dried. The dry salt was then heated in a steam bath with a 50% excess of benzoic anhydride for 30 minutes. The melt was then steam distilled to remove the excess benzoic acid (and any ethyl benzoate which might be present due to residual ethanol). The coniferyl benzoate crystallized from the residual solution on cooling and the crystals were filtered off and recrystallized from ether, although methanol was likewise useful. A 51% yield of crystals melting at 70–71° C. was obtained.

By replacing benzoic anhydride in the above example with a molecularly equivalent amount of phenylacetic anhydride or acetic anhydride, other esters of coniferyl alcohol can be prepared. In a similar manner when the lithium salt of coniferyl alcohol is replaced by an equivalent amount of the lithium salt of 3,4-dihydroxycinnamyl alcohol, 3,4-dihydroxycinnamyl benzoate having the formula:

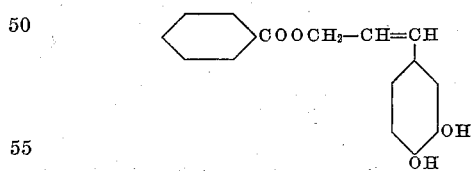

can be obtained. In like manner when a molecularly equivalent amount of the lithium salt of 3,4-methylenedioxycinnamyl alcohol is reacted with a molecularly equivalent amount of acetic anhydride according to the process of Example VI, 3,4-methylenedioxycinnamyl acetate having the formula:

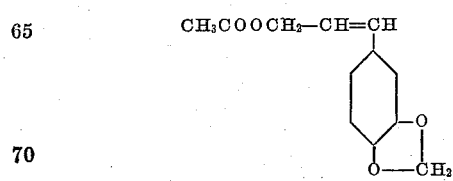

can be obtained.

By substituting molecularly equivalent amounts of other nuclear-substituted cinnamyl alcohol lithium salts and other organic carboxylic acid anhydrides in Example VI, still other esters can be prepared.

Many of the nuclear-substituted cinnamyl alcohols, and their esters, prepared in accordance with the process of our invention are useful as antioxidants. Many of these products also polymerize readily in the presence of acidic reagents.

We claim:

1. A process for preparing a nuclear-substituted cinnamyl alcohol which comprises selectively reducing a compound selected from those represented by the following two formulas:

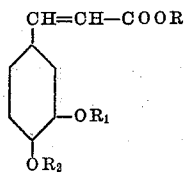

and

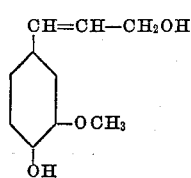

wherein R represents an alkyl group, and $R_1$ and $R_2$ each represents a member selected from the group consisting of a methyl group, an ethyl group, and an acetyl group, with lithium aluminum hydride having the formula:

LiAlH₄ and liberating the nuclear-substituted cinnamyl alcohol from the lithium salt of the nuclear-substituted cinnamyl alcohol which forms during the selective reduction by treating the lithium salt with an aqueous solution of a compound selected from the group consisting of boric acid, disodium phosphate, ammonium chloride and ammonium sulphate.

2. A process for preparing coniferyl alcohol represented by the formula:

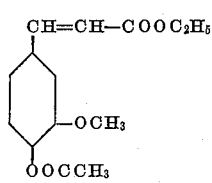

which comprises selectively reducing ethyl acetylferulate represented by the formula:

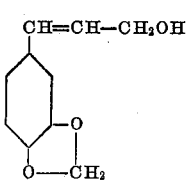

with lithium aluminum hydride having the formula:

LiAlH₄ and liberating the coniferyl alcohol from the lithium salt which forms during the selected reduction by treating the lithium salt with an aqueous solution of ammonium sulphate.

3. A process for preparing a nuclear-substituted cinnamyl alcohol which comprises selectively reducing in the presence of an organic solvent a compound selected from those represented by the following two formulas:

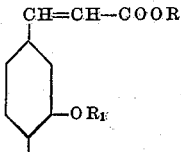

and

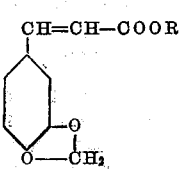

wherein R represents an alkyl group, and $R_1$ and $R_2$ each represents a member selected from the group consisting of a methyl group, an ethyl group, and an acetyl group, with lithium aluminum hydride having the formula:

LiAlH₄ and liberating the nuclear-substituted cinnamyl alcohol from the lithium salt of the nuclear-substituted cinnamyl alcohol which forms during the selective reduction by treating the lithium salt with an aqueous solution of a compound selected from the group consisting of boric acid, disodium phosphate, ammonium chloride and ammonium sulphate.

4. A process for preparing coniferyl alcohol represented by the formula:

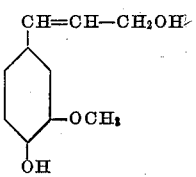

which comprises reacting an ethereal solution of ethyl acetylferulate represented by the formula:

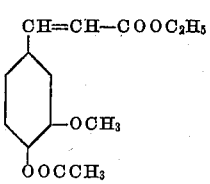

with lithium aluminum hydride having the formula:

LiAlH₄ thereafter adding an aqueous solution of ammonium sulfate to the reaction mixture, and separating the coniferyl alcohol from the reaction mixture.

5. A process for preparing 3,4-methylenedioxy-cinnamyl alcohol having the formula:

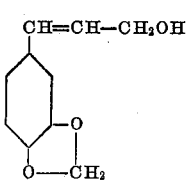

which comprises selectively reducing, in the presence of substantially anhydrous ethyl ether, ethyl 3,4-methylenedioxycinnamate represented by the formula:

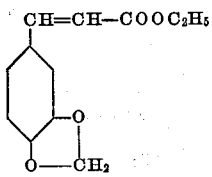

with lithium aluminum hydride having the formula:

LiAlH₄ and liberating 3,4-methylenedioxycinnamyl alcohol from the lithium salt of said alcohol which forms during the selective reduction by treating the lithium salt with an aqueous solution of ammonium sulphate.

6. A process for preparing 3-ethoxy-4-hydroxycinnamyl alcohol having the formula:

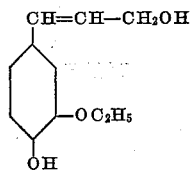

which comprises selectively reducing, in the presence of substantially anhydrous ethyl ether, ethyl 3-ethoxy-4-acetoxycinnamate represented by the formula:

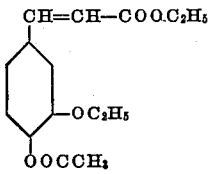

with lithium aluminum hydride having the formula:

LiAlH₄ and liberating 3-ethoxy-4-hydroxycinnamyl alcohol from the lithium salt of said alcohol which forms during the selective reduction by treating the lithium salt with an aqueous solution of ammonium sulphate.

CHARLES F. H. ALLEN.
JOHN R. BYERS, Jr.

REFERENCES CITED

The following references are of record in the file of this patent:

UNITED STATES PATENTS

| Number | Name | Date |
|---|---|---|
| 2,211,467 | Kimball | Aug. 13, 1940 |
| 2,212,532 | Werder | Aug. 27, 1940 |
| 2,213,717 | Poizat et al. | Sept. 3, 1940 |
| 2,310,973 | Lott | Feb. 16, 1943 |
| 2,319,197 | Bachman | May 18, 1943 |
| 2,414,120 | Pearl | Jan. 14, 1947 |

OTHER REFERENCES

Finholt et al.: "Jour. Am. Chem. Soc.," vol. 69 (1947), pages 1199–1203.

Nystrom et al.: "Jour. Am. Chem. Soc.," vol. 69 (1947), pages 2549–2550.